N. D. WHITMAN.
SECTIONAL CONDUIT.
APPLICATION FILED AUG. 14, 1915.
1,173,234.
Patented Feb. 29, 1916.
2 SHEETS—SHEET 1.
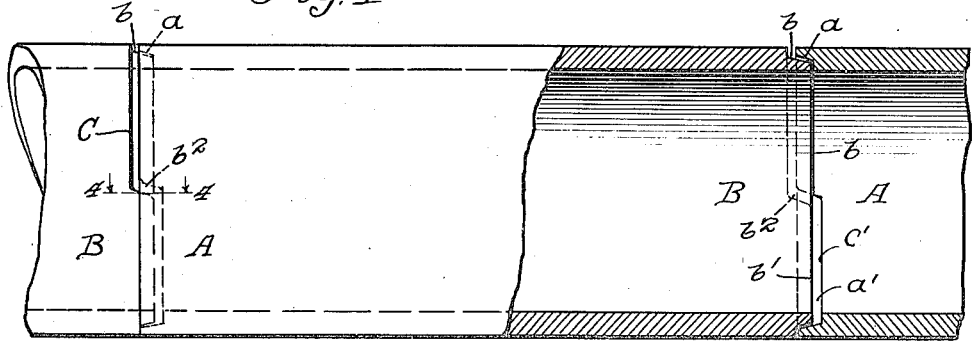
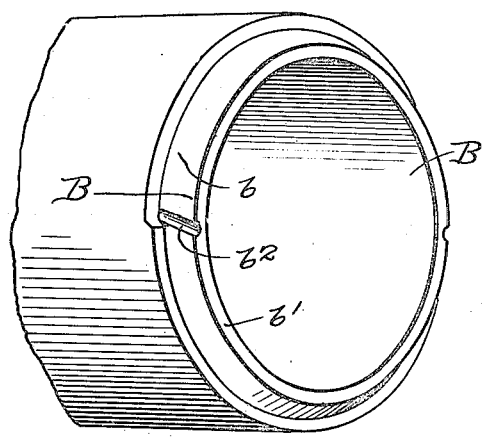
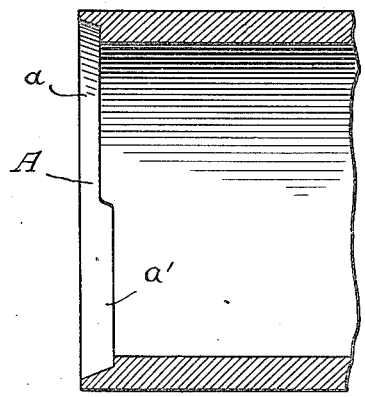
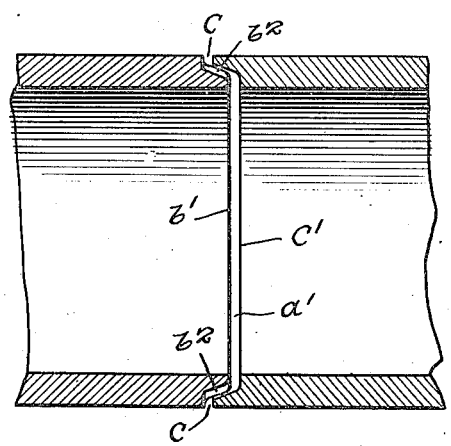

N. D. WHITMAN.
SECTIONAL CONDUIT.
APPLICATION FILED AUG. 14, 1915.
1,173,234.
Patented Feb. 29, 1916.
2 SHEETS—SHEET 2.
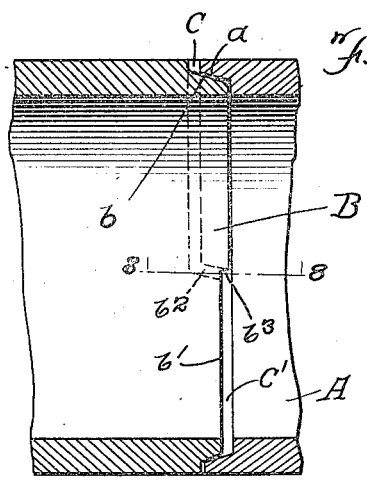
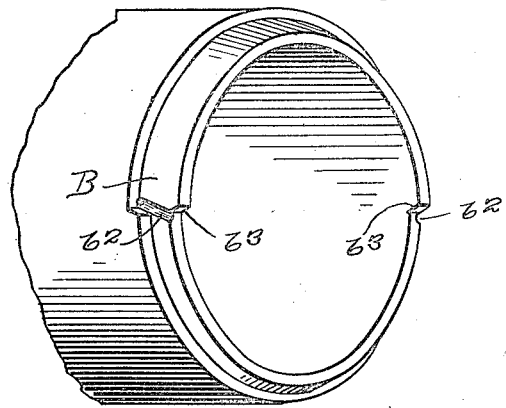
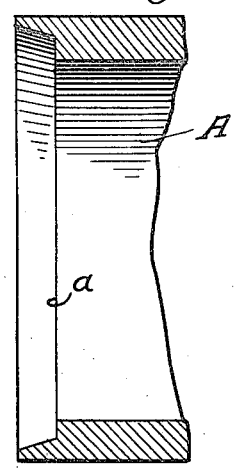
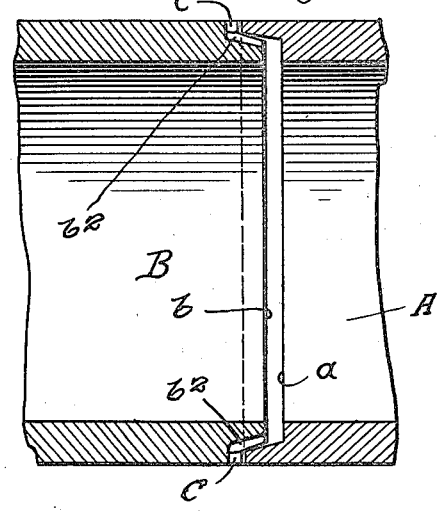

UNITED STATES PATENT OFFICE.

NATHAN D. WHITMAN, OF CHICAGO, ILLINOIS, ASSIGNOR TO CHICAGO REINFORCED CONCRETE PIPE COMPANY, OF CHICAGO, ILLINOIS, A CORPORATION OF SOUTH DAKOTA.

SECTIONAL CONDUIT.

1,173,234.  Specification of Letters Patent.  Patented Feb. 29, 1916.

Application filed August 14, 1915. Serial No. 45,575

*To all whom it may concern:*

Be it known that I, NATHAN D. WHITMAN, a citizen of the United States, residing at Chicago, in the county of Cook and State of Illinois, have invented certain new and useful Improvements in Sectional Conduits, of which the following is a specification, reference being had therein to the accompanying drawing.

My invention relates to sectional conduits, such as are used for constructing sewers for example, and its object is to provide a new and improved joint for the coterminal ends of the sections when they are placed in position.

In the accompanying drawings which illustrate embodiments of my invention Figure 1 is a view partly in side elevation and partly in section showing a plurality of conduit sections or pipes constructed according to my invention in their associated relation to have their joints grouted; Fig. 2 is a perspective view of the spigot end of the pipes of Fig. 1; Fig. 3 is a vertical longitudinal view of the bell end of the pipes of Fig. 1; Fig. 4 is a horizontal longitudinal sectional view through the joint between the pipes on the line 4—4 of Fig. 1; Fig. 5 is a vertical longitudinal sectional view of the joint of a pair of pipes having my invention embodied in slightly different form; Fig. 6 is a perspective view of the spigot end of the joint of Fig. 5; Fig. 7 is a vertical longitudinal sectional view of the bell end of the joint of Fig. 5, and Fig. 8 is a horizontal longitudinal view on the line 8—8 of Fig. 5.

Referring first to the construction shown in Figs. 1 to 4, each pipe or conduit section is formed at one end with a bell A and at its other with a spigot B adapted to enter the bell of an adjacent section when the parts are assembled in laying the pipe or conduit. The bell and spigot are so related that the part $b$ of the spigot which is at that portion of the sections considered as the top when laying the pipe is wider than the corresponding upper part $a$ of the bell into which it enters, so that the adjacent walls form a semi-circumferential outer top groove or recess C for the grouting when the sections are assembled, and the lower portion $b'$ of the spigot is narrower than the corresponding lower portion $a'$ of the bell into which it enters so that the parts form an inner lower groove or recess C' for the grouting when the sections are assembled. In this form the end of the spigot is flat or in the same plane, and the lower part $a'$ of the bell is prolonged rearwardly or cut-back beyond the line of its upper part $a$ as clearly shown at Fig. 3. For convenience of pouring from the outside the grouting to fill the inner groove C', the spigot is provided at the ends of its portion which is wider than the bell with channels or depressions $b^2$ at an angle to the cross plane of the spigot and affording communication between the inner and outer grooves so that when grouting or cement is poured into the outer groove it will pass into the inner groove to seal the joint between the sections.

Referring to the construction shown in Figs. 5 to 8, the width of the bell is uniform as shown at $a$, the upper portion $b$ of the spigot is wider than the bell and the end of the lower portion $b$ of the spigot is cut-back as shown at $b^3$ so that this portion is narrower than the bell. When the sections are assembled the outer and inner grooves C and C' are formed at the top and bottom respectively of the joint, and the channels $b^2$ for the passage of the grouting to the inner groove may be provided as before.

In both forms the spigot for its entire circumference is inside the bell, and the entire width of the lower portion enters the bell so that while the inner grooves for the grouting are provided in the lower portion of the joint the spigot is supported in and carried by the bell which forms a seat for it instead of merely having its lower portion abutting against the bell.

In laying the pipe the spigot is entered into the associated bell as shown in Figs. 1 and 5, and the grouting is poured into the top groove from the outside to fill both the inner and outer grooves and their connecting channels, and when the grouting which is usually a fluid cement sets it unites the sections in a tight and strong joint, it being obvious that when the sections are likewise composed of cement the entire pipe will form a practically homogeneous or monolithic structure. Instead of filling the inner groove from the outside it may be filled from the inside. The channels $b^2$ may be omitted where they are not desired or required.

I claim:—

1. A pipe section having a bell at one end and a spigot at the other, the spigot at its top portion being wider than the bell and at its bottom portion being narrower than the bell.

2. A pipe section having a bell at one end and a spigot at the other, the spigot at its top portion being wider than the top portion of the bell and provided at the ends of its top portion with angular channels, and the bell at its bottom portion being wider than the bottom portion of the spigot.

3. A pipe section having a bell at one end and a spigot at its other end, the bell at its top portion being narrower than the upper portion of the spigot and at its bottom portion being cut-back to a width greater than the bottom portion of the spigot to provide a seat for the lower portion of the spigot and a lower groove between assembled sections.

4. A pipe formed in sections, each section having a bell at one end and a spigot at its other end, the bell at its top portion being narrower than the top portion of the spigot to provide a top outer groove and at its lower portion being wider than the lower portion of the spigot to provide an inner groove between the lower portions of the sections.

5. A pipe formed in sections, each section having a bell at one end and a spigot at its other end, the spigot at its top portion being wider than the bell to provide a top outer groove, angular channels in the spigot at the ends of such groove, and the spigot at its lower portion being narrower than the bell to provide an inner groove between the lower portions of the sections and communicating at its ends with the angular channels in the spigot.

In testimony whereof I affix my signature in presence of two witnesses.

NATHAN D. WHITMAN.

Witnesses:
 EDITH WILCOX,
 J. McROBERTS.